(12) United States Patent
Kraft et al.

(10) Patent No.: US 7,607,308 B2
(45) Date of Patent: Oct. 27, 2009

(54) SHROUDED TURBOFAN BLEED DUCT

(75) Inventors: Robert Eugene Kraft, Cincinnati, OH (US); Nelson Dirk Gibbens, Mason, OH (US); Rolf Robert Hetico, Cincinnati, OH (US); William Charles Groll, North Bend, OH (US); William Andrew Bailey, Cincinnati, OH (US); James Edward Stoker, Milford, OH (US)

(73) Assignee: General Electric Company, Schenectady, NY (US)

( * ) Notice: Subject to any disclaimer, the term of this patent is extended or adjusted under 35 U.S.C. 154(b) by 699 days.

(21) Appl. No.: 11/297,698

(22) Filed: Dec. 8, 2005

(65) Prior Publication Data

US 2007/0130912 A1 Jun. 14, 2007

(51) Int. Cl.
*F02C 6/04* (2006.01)
(52) U.S. Cl. .................. 60/785; 60/795; 60/226.1
(58) Field of Classification Search ......... 60/226.1, 60/728, 785, 795, 262, 266, 782; 181/213–216, 181/219; 415/119
See application file for complete search history.

(56) References Cited

U.S. PATENT DOCUMENTS

| | | | |
|---|---|---|---|
| 5,123,242 A * | 6/1992 | Miller | 60/226.1 |
| 5,203,163 A * | 4/1993 | Parsons | 60/226.1 |
| 5,351,473 A | 10/1994 | Shuba | |
| 5,729,969 A * | 3/1998 | Porte | 60/226.1 |
| 5,782,077 A * | 7/1998 | Porte | 60/782 |
| 6,065,932 A | 5/2000 | Dodd | |
| 7,200,999 B2 * | 4/2007 | Bagnall et al. | 60/785 |

OTHER PUBLICATIONS

GE Aircraft Engines, "Precooler Fan Bleed Duct," On sale in USA for more than one year before Oct. 2005.
Hartmann et al, "A New Acoustic Generator," J. Sci. Instr., vol. 4, 1927, pp. 101-111.
Hamad et al, "Numerical Simulation and Parametric Study of Hartmann-Spenger Tube based Powered Device," AIAA-2003-0550, 2003; pp. 1-10.
GE Aircraft Engines, "General Electric CF6-80C2," Flight International,1987, single page.
GE Aircraft Engines, "CF6-80C2 Engine Airflow FADEC Control," On sale and in public use in the USA for more than one year before Oct. 2005, single page.

* cited by examiner

*Primary Examiner*—Michael Cuff
*Assistant Examiner*—Phutthiwat Wongwian
(74) *Attorney, Agent, or Firm*—William S. Andes; Francis L. Conte

(57) ABSTRACT

A bleed duct is configured for bleeding fan air from the fan bypass duct in a turbofan aircraft engine. The bleed duct includes a tubular conduit having an inlet and outlet at opposite ends. The conduit is configured in flow area for recovering pressure from speeding fan air bled therethrough. A shroud extends forwardly from the duct inlet for suppressing dynamic pressure oscillations inside the conduit without degrading the pressure recovery.

35 Claims, 7 Drawing Sheets

SHROUDED TURBOFAN BLEED DUCT

BACKGROUND OF THE INVENTION

The present invention relates generally to gas turbine engines, and, more specifically, to air bleeding therein.

Modern aircraft are typically powered by turbofan aircraft engines. The turbofan engine is a specialized form of gas turbine engine in which air flows through a fan and compressor that pressurizes the air in turn which is then mixed with fuel in a combustor for generating hot combustion gases.

A core engine includes the compressor and combustor and cooperating high and low pressure turbines that extract energy from the combustion gases for powering the compressor and fan, respectively.

Most of the inlet air is pressurized by the fan and bypasses the core engine for producing a majority of propulsion thrust for powering the aircraft in flight. A portion of the fan air is directed into the core engine wherein it is further pressurized in multiple stages of increasing pressure in the compressor therein.

The turbofan engine not only powers the aircraft in flight but also provides customer bleed air thereto for typical use by the aircraft manufacturer and operator in the environmental control inside the aircraft or for deicing the aircraft wings in two examples.

The typical turbofan engine includes a multistage axial compressor having various bleed circuits initiating therein for extracting pressurized air at different pressure and temperature as required for various purposes.

In one exemplary commercial turbofan aircraft engine on sale in the United States for more than one year, pressurized air is bled from the compressor and channeled through a precooler or heat exchanger in a primary circuit thereof. A secondary circuit bleeds pressurized air from the fan bypass duct to the same heat exchanger. The fan air is used in the heat exchanger for precooling the hot bleed air provided by the compressor. The fan air is then dumped overboard from the heat exchanger, and the compressor air is channeled to the aircraft for further use therein.

The heat exchanger is used for reducing the temperature of the hot bleed air from the compressor below the auto-ignition temperature of the fuel stored in the aircraft wings for providing a corresponding safety margin.

Cooling compressor bleed air in this fashion commonly occurs in different types of aircraft that share the common use of the air-to-air heat exchanger for the different compressor and fan air circuits. The fan air circuit necessarily requires a suitable inlet disposed inside the bypass duct downstream of the fan, and must be suitably designed for maximizing aerodynamic performance thereof.

The modern turbofan aircraft engine enjoys substantial efficiency of performance, and is designed for high durability and life. Accordingly, the fan air bleed duct is precisely designed in configuration and flow area for maximizing pressure recovery of the speeding bypass fan air and thereby maximize engine performance.

The bleed duct may have many configurations, and in the commercial application disclosed above the bleed duct is mounted in the fan bypass duct for receiving the fan air in substantially direct alignment along the longitudinal axis of the bleed duct.

The bleed duct includes a valve between its outlet and the inlet to the heat exchanger for controlling bleed flow therethrough. When the valve is closed at the outlet end of the bleed duct, the inlet end of the bleed duct remains open and is subject to the rush of incoming fan air. This configuration may result in the formation of a Hartmann Generator that causes unstable dynamic pressure oscillations inside the closed bleed duct which can lead to sonic fatigue and subsequent damage of the associated parts.

The typical solution to this problem is allowing the bleed valve to remain partially open when it would otherwise be closed during the aircraft operating cycle to prevent dynamic instability in the bleed duct and avoid damage thereto.

However, in the continuing development of the commercial application described above, it is undesirable to leave the bleed valve even slightly open when it should be closed for increasing the overall efficiency of the turbofan engine.

This presents a significant design problem since the basic configuration of the turbofan engine has been fixed based on previous development and expense rendering impractical the redesign thereof.

There are many components found in the bleed system for the compressor and fan, including the cooperating heat exchanger therefor, for which a change in inlet design of the bleed duct could have adverse consequences requiring further development, time, and cost.

Accordingly, it is desired to provide an improved bleed duct having minimal changes for permitting operation thereof when the valve is closed without undesirable dynamic pressure oscillations, and without degrading performance of the bleed duct when the valve is open.

BRIEF DESCRIPTION OF THE INVENTION

A bleed duct is configured for bleeding fan air from the fan bypass duct in a turbofan aircraft engine. The bleed duct includes a tubular conduit having an inlet and outlet at opposite ends. The conduit is configured in flow area for recovering pressure from speeding fan air bled therethrough. A shroud extends forwardly from the duct inlet for suppressing dynamic pressure oscillations inside the conduit without degrading the pressure recovery.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
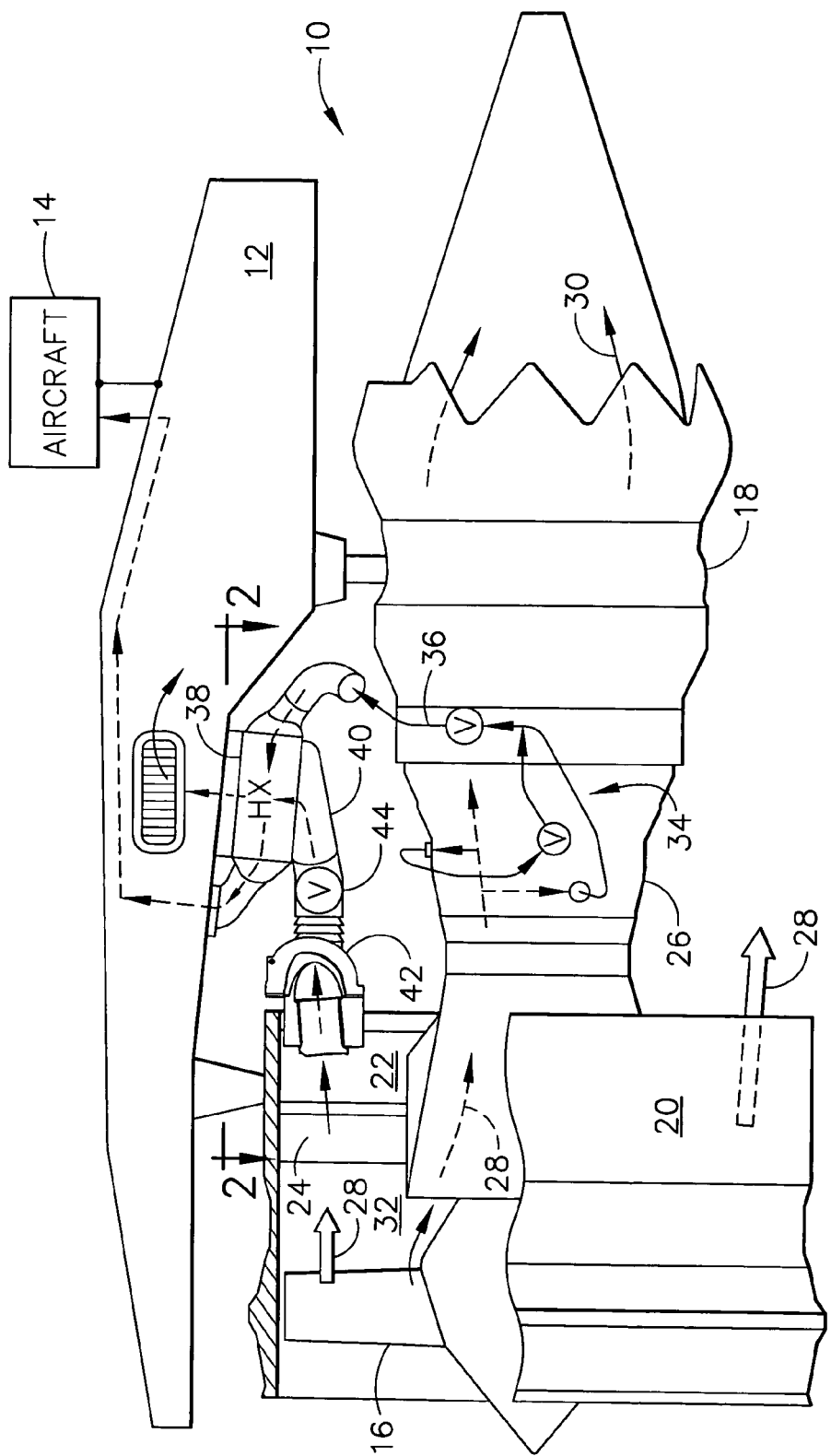
FIG. 1 is a partly sectional axial view of an exemplary turbofan gas turbine aircraft engine mounted to the supporting pylon in an aircraft.

Illustrated schematically in FIG. 1 is a turbofan gas turbine aircraft engine 10 suitably mounted to the supporting pylon 12 in an aircraft 14, shown schematically. The engine includes a fan 16 powered by a core engine 18 coaxially joined thereto. The fan 16 includes a row of fan blades mounted inside an annular fan casing 20, with the fan casing being mounted to the forward end of the core engine by a row of fan struts 22, and another row of fan outlet guide vanes (OGVs) 24.

The core engine includes a multistage axial compressor 26 having sequential stages of stator vanes and rotor blades which pressurize in turn the incoming air 28. Pressurized air is discharged from the compressor and mixed with fuel in the combustor of the core engine for generating hot combustion gases 30 that flow downstream through high and low pressure turbines which extract energy therefrom prior to discharging the combustion gases from the outlet of the core engine. The high pressure turbine powers the compressor, and the low pressure turbine powers the fan 16 at the upstream end of core engine.

The fan casing surrounds the forward end of the core engine and defines a substantially annular fan bypass duct 32 therebetween. A majority of the air pressurized in the fan 16 is discharged through the OGVs 24 and between the fan struts 22 through the outlet end of the fan casing for providing a majority of the propulsion thrust for powering the aircraft in flight. The radially inner portion of the fan air enters the inlet end of the core engine and is pressurized in stages in the compressor 26 for use in the combustion process.

As indicated above, the turbofan engine typically includes a bleed system 34 for bleeding pressurized air from the compressor 26 during operation for subsequent use in the aircraft 14 when desired. The bleed system 34 includes a primary bleed circuit 36 which includes conduits and valves for bleeding pressurized air from the compressor. For example, the primary circuit 36 is configured for bleeding both fifth and ninth stage pressurized air, at increasing pressure and temperature, from the compressor for subsequent use in the aircraft.

The bleed system further includes a conventional air-to-air precooler or heat exchanger 38 suitably mounted to the underside of the pylon 12 in close proximity to the compressor 26. The heat exchanger includes two circuits therein, one of which is connected to the primary bleed circuit 36 for receiving the hot pressurized air from the compressor.

The bleed system 34 also includes a secondary bleed circuit 40 that includes various components for bleeding a portion of the relatively cool pressurized fan air 28 from the fan bypass duct 32 for flow through the secondary circuit of the heat exchanger 38. The cool fan air is circulated through the heat exchanger for cooling the hot compressor bleed air.

The spent fan air is discharged from the heat exchanger 38 through a suitable outlet in the pylon 12 and dumped overboard during aircraft operation. The cooled compressor bleed air is discharged from the heat exchanger 38 through the outlet end of the primary circuit 36 and suitably channeled into the aircraft 14 for any suitable purpose.

The bleed system 34 is suitably controlled by a conventional aircraft control system, which is operatively joined to the various valves therein, both in the primary circuit 36 as well as in the secondary circuit 40.

More specifically, the secondary bleed circuit 40 includes a fan bleed duct 42 configured for bleeding a portion of the fan air from the fan bypass duct 32 through a suitable control valve 44 disposed at the outlet end thereof which in turn is suitably joined to the secondary circuit of the heat exchanger 38.

The valve 44 in turn is electrically joined to the aircraft control system and may be operated in an open position allowing unobstructed flow of the fan air through the bleed duct 42 into the heat exchanger, and in a fully closed position blocking completely the passage of the fan air through the bleed duct 42 into the heat exchanger.

The turbofan engine 10 and bleed system 34 described above are conventional, and have been offered for sale in the United States for more than a year, except for the improved fan bleed duct 42 itself. As indicated above, in conventional practice, the bleed valve 44 may be positioned slightly opened in its otherwise closed position to permit a reduced flow of the fan bleed air through the heat exchanger to prevent the undesirable dynamic pressure oscillations described above due to the Hartmann Generator principle.

Figure 2:
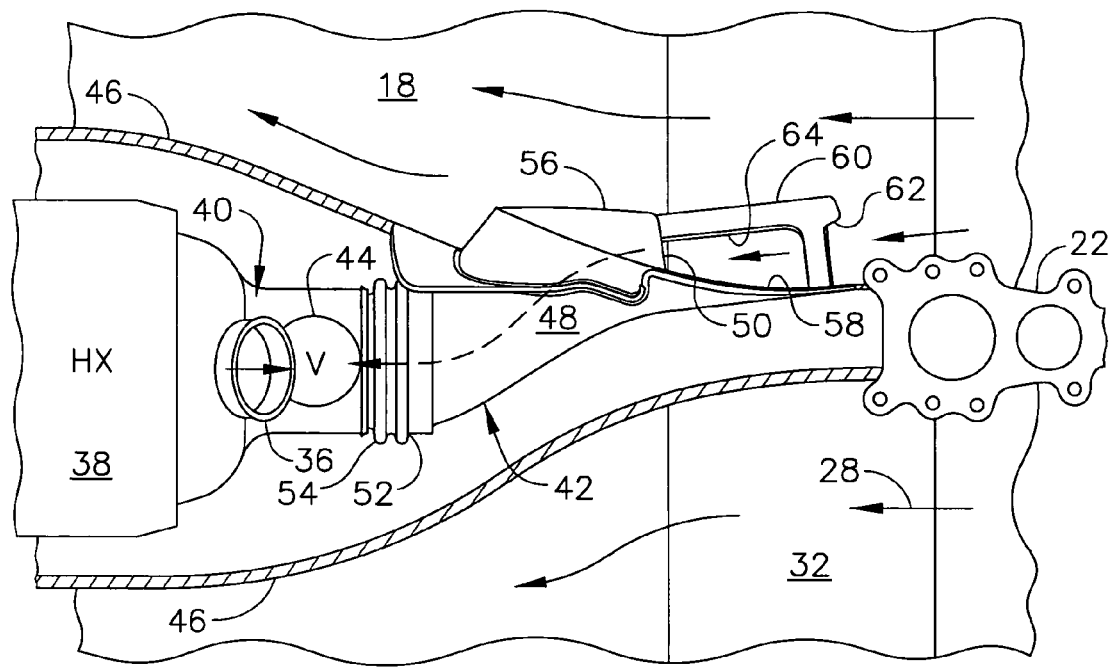
FIG. 2 is a partly sectional (reversed) view of the turbofan engine illustrated in FIG. 1 and taken along line 2-2 to show a portion of the bleed system therein.

FIG. 2 illustrates the specific configuration of the fan bleed duct 42 when mounted in the engine at the discharge end of the fan bypass duct 32. As indicated above, the turbofan engine is supported from the pylon 12 in a conventional manner typically utilizing forward and aft engine mounts and cooperating thrust links.

Between the engine mounts is typically found an enclosed chamber commonly referred to as a bifurcation 46 in which various miscellaneous components may be mounted, including the heat exchanger 38 and the fan bleed duct 42 extending upstream therefrom. FIG. 2 illustrates the two sidewalls of the bifurcation behind one of the fan struts 22 which provides a convenient location for mounting the fan bleed duct 42 for directly receiving the incident fan air 28 pressurized by the fan.

The fan bleed duct 42 illustrated in FIG. 2 includes a tube or tubular conduit 48 formed of a suitable material such as cast titanium. The tube 48 includes an annular duct inlet 50 at the forward end thereof which is suitably joined to the fan bypass duct 32 for receiving the pressurized fan air 28 therefrom. The tube 48 also includes an annular duct outlet 52 at its opposite aft end which is suitably joined to the secondary circuit 40 by a flexible silicone bellows 54.

The bleed duct 42 is fixedly joined to the engine bifurcation 46, and the flexible bellows 54 absorbs vibratory movement between the bleed duct and the inlet end of the heat exchanger 38 during operation. The control valve 44 joins in flow communication the duct outlet 52 with the heat exchanger for controlling flow of the fan bypass air into the secondary circuit of the heat exchanger when desired.

In the specific configuration illustrated in FIG. 2, the duct inlet 50 and outlet 52 are laterally offset from each other along the longitudinal flow axis of the tubular conduit 48 to accommodate the diverging configuration of the two walls of the bifurcation 46 as they spread in the downstream direction and encompass the relatively wide heat exchanger 38.

The offset configuration of the tube 48 effects a laterally offset scoop 56 at the forward end of the tube which projects into the bypass duct 32 and contains the duct inlet 50, also referred to as the scoop inlet.

The tube 48 further includes a streamlined inlet trough or ramp 58 extending forward from the scoop inlet 50 which is configured to match the curvature of the bifurcation wall and provide an aerodynamically smooth transition into the scoop 56 that projects outwardly from the ramp and into the bypass duct 32.

In this way, the scoop inlet faces directly forwardly substantially normal to the incoming fan air for efficiently capturing a portion of that fan air and diverting it through the tube 48 and the outlet 52 thereof into the heat exchanger 38 through the control valve 44.

This configuration of the fan bleed duct 42 and its mounting within the bifurcation 46 is conventional, and found in the previous configuration of the turbofan engine described above which has been offered for sale in the United States for more than one year.

However, further development testing of this configuration of the fan bleed duct 42 confirms its potential operation as a Hartmann Generator when the valve 44 is maintained fully closed. In this configuration, the duct outlet 52 is closed while its inlet 50 remains open and directly receives the pressurized fan air from the upstream fan.

Unstable dynamic pressure oscillations can occur in the fan air trapped inside the closed tube 48 leading to undesirable damage thereof and damage to the bellows 54.

Leaving partially open the control valve 44 is not a desirable solution to this dynamic oscillation problem since such operation would decrease the overall efficiency of the engine and aircraft and should be avoided.

The original fan bleed duct 42 is a preexisting design which enjoys the benefit of the considerable previous development thereof for maximizing efficiency of the engine in which it is used. The bleed duct 42 is specifically configured in size and flow area for efficiently channeling the pressurized fan air into the heat exchanger for the corresponding flow requirements of the heat exchanger in cooling the pressurized bleed air from the compressor, all at specifically determined flow rates.

Accordingly, the flow requirements of the duct inlet 50 are predetermined, as well as the flow area of the duct outlet 52 which is larger than the inlet area for achieving efficient pressure recovery of the speeding fan air received from the fan bypass duct during operation. The bleed duct 42 is configured like a diffuser in which the high velocity of the inlet air received by the duct is reduced upon flow through the duct for recovering pressure therefrom.

The inventors were therefore presented with the considerable problem and constraints of minimizing changes to the preexisting fan bleed duct 42 to avoid degrading or reducing the aerodynamic performance thereof, including the pre-established pressure recovery therefrom, while also preventing or suppressing dynamic pressure oscillations or fluctuations inside the bleed duct itself due to the Hartmann Generator principle when the valve 44 is operated fully closed.

Described hereinbelow are multiple embodiments of the improved fan bleed duct 42 which have been built and tested in most part to confirm efficacy and efficiency thereof, which varies between the alternate designs.

However, all of the various designs disclosed hereinbelow include the common feature of an auxiliary acoustic suppression shroud 60 extending forwardly from the original scoop inlet 50 for suppressing the dynamic pressure oscillations inside the bleed duct 42 when the valve 44 is closed. Correspondingly, when the valve 44 is open, the introduction of the added shroud 60 does not significantly degrade the aerodynamic performance of the original bleed duct 42 itself for maintaining the overall efficiency of the engine in its specific aircraft engine application.

The acoustic suppression shroud 60 is illustrated installed in the engine in FIG. 2 and extends forwardly from the bifurcation 46 in the upstream direction from the duct inlet 50 and is exposed inside the fan bypass duct 32 for suppressing dynamic pressure oscillations inside the hidden bleed conduit 48 when the control valve 44 is closed. The shroud 60 is an aerodynamically thin or streamlined component mounted inside the fan bypass duct for minimizing pressure losses therefrom since it is directly exposed at all times to the speeding fan discharge air.

In the preferred embodiment illustrated, the shroud 60 is coextensive or concentric with the duct inlet 50 and extends generally coaxially with the scoop 56 in line-of-line sight alignment therewith in the upstream direction.

The shroud 60 includes its own shroud inlet 62 at the forward end or leading edge thereof which is spaced forwardly from the cooperating duct or scoop inlet 50. The added shroud 60 is therefore coextensive with the original scoop 56 at the inlet 50 thereof and similarly projects into the fan bypass duct from the side of the bifurcation 46.

In this way, the added shroud 60 structurally modifies the scoop inlet 56 and introduces a cooperating shroud inlet 62 upstream therefrom specifically configured and sized for efficient aerodynamic performance of the shroud itself with minimal pressure losses therefrom and minimal disturbance of the fan discharge air during all operating conditions of the engine, including the open and closed positions of the bleed valve 44.

As indicated above in the Background section, the line-of-sight projection of the bleed duct 42 into the oncoming fan discharge air channeled through the fan bypass duct 32 has been shown to develop undesirable dynamic pressure oscillations in the bleed duct when the control valve 44 is closed. It is believed that these dynamic pressure oscillations are attributed to the Hartmann Generator principle also disclosed above. The Hartmann Generator is a well known device and has been studied for many decades for its ability to intentionally produce the dynamic pressure oscillations that are characterized by corresponding acoustic sound waves emanating from the resonator cavity thereof.

Since the Hartmann Generator is specifically configured for the generation of pressure oscillations and acoustic radiation of sound waves, previous solutions for disabling the Hartmann Generator are unknown, except for the simple solution of opening the otherwise closed blind end of the resonator for disabling the excitation mechanism before its inception.

The suppression shroud 60 disclosed above has been conceived due to laboratory testing of various configurations thereof in an attempt to solve the acoustic excitation of the pre-existing fan bleed duct 42 when the valve 44 is closed. Tests confirm the efficacy of the shroud 60 in suppressing the pressure oscillations inside the bleed conduit 48 when the valve 44 is closed.

However, the theory of its suppression capability is not fully understood, although it appears that the suppression shroud 60 is effective for interrupting or disabling the energy coupling between the incident fan discharge air and the air trapped in the bleed duct 42 when the valve 44 is closed.

Various configurations of the suppression shroud 60 are illustrated in the several Figures and have different efficacy for suppressing the pressure oscillations while also minimizing aerodynamic efficiency losses when mounted inside the fan bypass duct.

FIGS. 1-5 illustrate a preferred embodiment of the shroud in one simple form. The relatively thin suppression shroud 60 illustrated in these figures provides a small extension of the scoop 56 itself in the upstream direction for constraining energy coupling between the speeding incident fan air and the fan air trapped inside the bleed duct when the valve is closed. Like the original scoop 56 itself, the suppression shroud 60 projects inside the fan bypass duct 32 in general axial alignment therewith.

Figure 5:
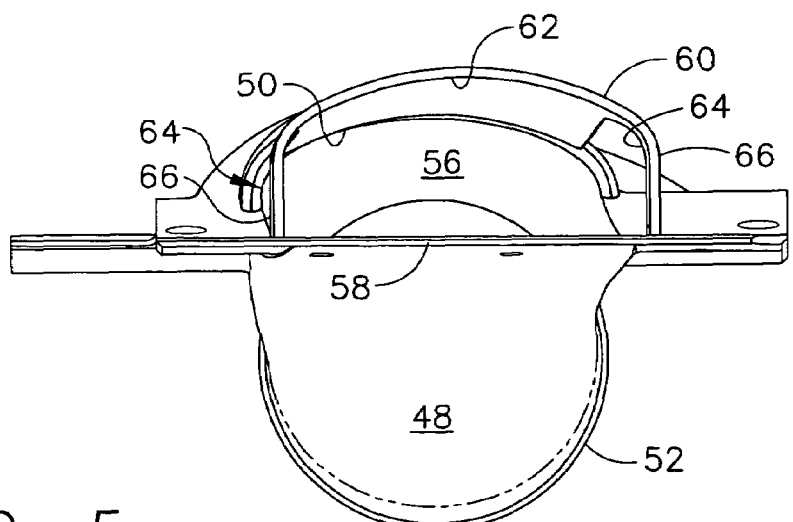
FIG. 5 is an aft facing front view of the bleed duct illustrated in FIG. 4 and taken along line 5-5.

As best illustrated in FIGS. 2 and 5, the shroud inlet 62 is coaxially aligned with the scoop inlet 50 in the upstream direction therefrom to minimize disturbance of the streamline flow of the fan air 28 into the scoop inlet 50. In this way, the shroud does not block or impede normal incident flow to the scoop inlet 50 to avoid undesirable pressure losses therefrom which would degrade aerodynamic performance of the engine.

The shroud 60 illustrated in FIG. 2 is generally parallel with the orientation of the scoop 56 to further minimize disturbance of the flow streamlines. The specific configuration and orientation of the shroud 60 can be selected by suitable testing to complement the specific configuration of the bleed duct 52 in its various forms and the associated scoop 56 when provided therein.

Figure 3:
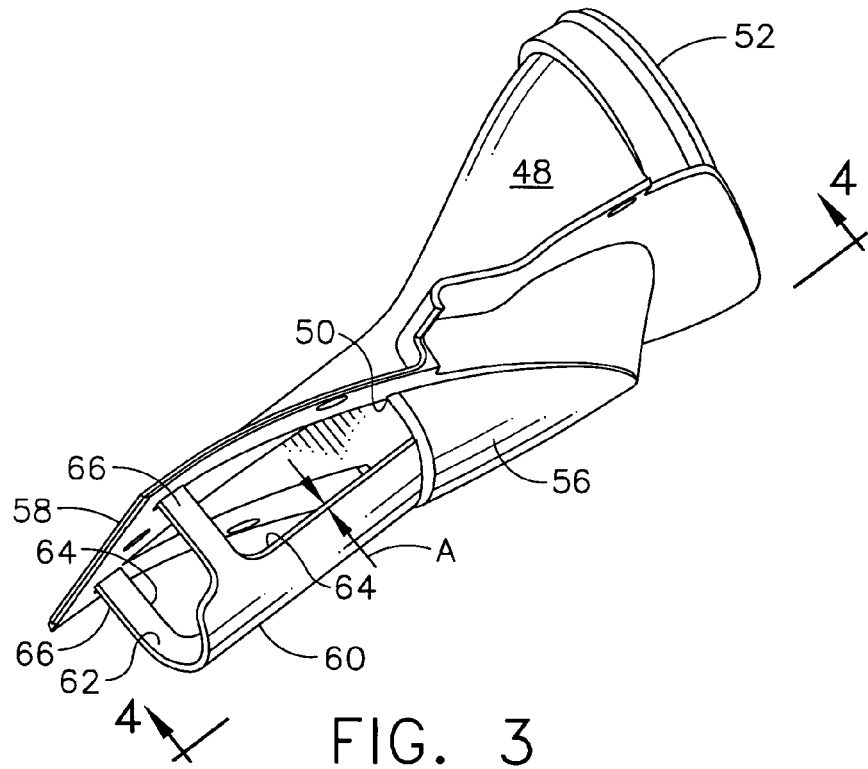
FIG. 3 is a isolated view of the bleed duct illustrated in FIG. 2 in accordance with an exemplary embodiment.

As shown in FIGS. 3 and 5, the original scoop 56 is laterally or circumferentially arcuate and imperforate for maintaining the imperforate configuration of the bleed conduit 48 between its inlet and outlet at opposite ends. The cooperating suppression shroud 60 is similarly circumferentially or laterally arcuate, and is itself also imperforate. Since the bleed conduit 48 includes the streamlined inlet ramp 58 extending forwardly from the scoop 56, the suppression shroud 60 conveniently extends directly over the inlet ramp 58 as an integral part of the entire bleed conduit 48, and like the inlet ramp provides a streamlined entrance into the scoop.

For example, the shroud 60 may be integrally joined to the forward end of the scoop 56 itself, either in an integral casting of the parent titanium metal if desired, or suitably welded thereto after separate initial manufacture thereof.

The shroud 60 has a nominal thickness A which is relatively thin and conforms with the corresponding thickness of the scoop 56 at its junction therewith. The thin shroud presents a minimum obstruction to the incident fan air and maintains an aerodynamically smooth profile with both smooth inner and outer surfaces aligned with the corresponding inner and outer surfaces of the scoop 56.

Figure 4:
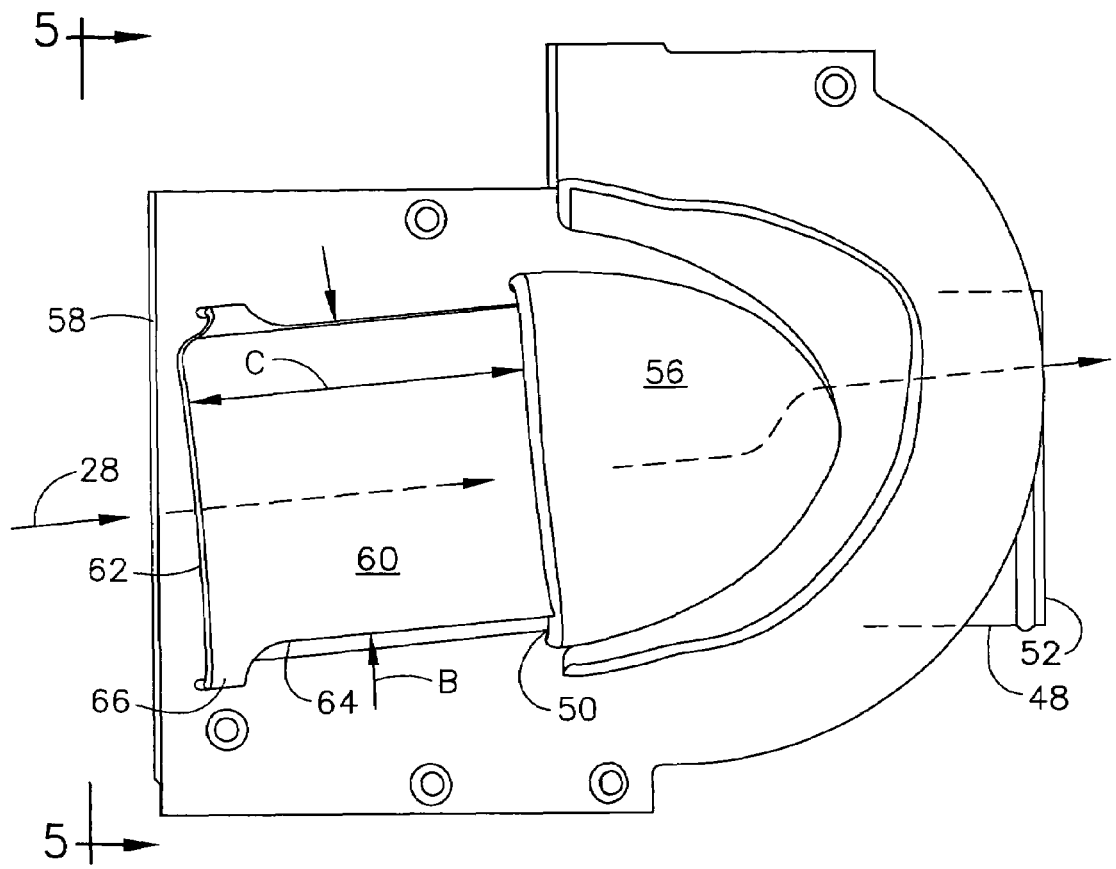
FIG. 4 is a plan view of the bleed duct illustrated in FIG. 3 and taken generally along line 4-4.

In the preferred embodiment illustrated in FIGS. 3-5, the shroud 60 has a circumferential width B which is suitably narrower than the corresponding width of the scoop 56 to create laterally opposite side windows or openings 64 that extend forwardly from the scoop inlet 50. The scoop inlet 50 is closed around its full circumference by the scoop 56 projecting into the bypass duct, and the cooperating inlet ramp 58 recessed into the supporting bifurcation.

In contrast, the suppression shroud 60 covers only a portion of the open volume in front of the scoop 56 to provide an unobstructed shroud inlet 62 and cooperating side openings 64.

Development testing of this configuration confirms the efficacy of this simply configured shroud 60 for suppressing and preventing the undesirable dynamic pressure oscillations within the closed fan bleed duct 42, while also minimizing aerodynamic pressure losses due to the introduction of the shroud 60 itself within the flowpath of the fan bypass duct.

The shroud 60 illustrated in FIGS. 3 and 4 is relatively thin sheet metal, and extends axially in length C forwardly from the leading edge of the scoop 56, with relatively large side openings 64 on the opposite sides thereof. The length C of the shroud is slightly larger than the length of the projecting scoop 56 and overhangs the inlet ramp 58 over most of its length from the scoop.

Accordingly, the shroud 60 further includes a pair of integral supporting legs 66 at the opposite corners of the forward end thereof which are suitably fixedly joined to the forward end of the bleed duct 48 at the end of the inlet ramp extension thereof. The entire shroud 60 including the two legs 66 may be fabricated from uniform thickness sheet metal welded to the original bleed conduit, or integrally cast therewith.

The two legs 66 rigidly support the thin shroud 60 over the entire entrance to the bleed duct 42, and the shroud inlet 62 is therefore bound by the leading edge of the shroud 60, the two legs 66 thereof, and the underlying inlet ramp 58. The side openings 64 of the shroud extend aft from the two legs 66 and define auxiliary inlets into the entrance trough defined between the inlet ramp 58 and the scoop inlet 50.

The acoustic shroud 60 illustrated in plan view in FIG. 4 has a rectangular profile or boundary matching substantially the full width of the scoop 56 at its inlet 50, and extends forwardly in length C therefrom. The shroud 60 fully covers the inlet ramp or trough, yet also permits substantially the entire exposed perimeter of the shroud 60 itself to remain fully open over the original entrance to the bleed duct.

In this way, minimal obstruction of the incident flowpath into the bleed duct is provided by the additional suppression shroud 60, and that suppression shroud constrains expansion of any pressure oscillations experienced inside the closed bleed duct 42. The undesirable dynamic pressure fluctuations from the closed duct may therefore be substantially reduced or eliminated by the simple introduction of the acoustic shroud 60.

Figure 6:
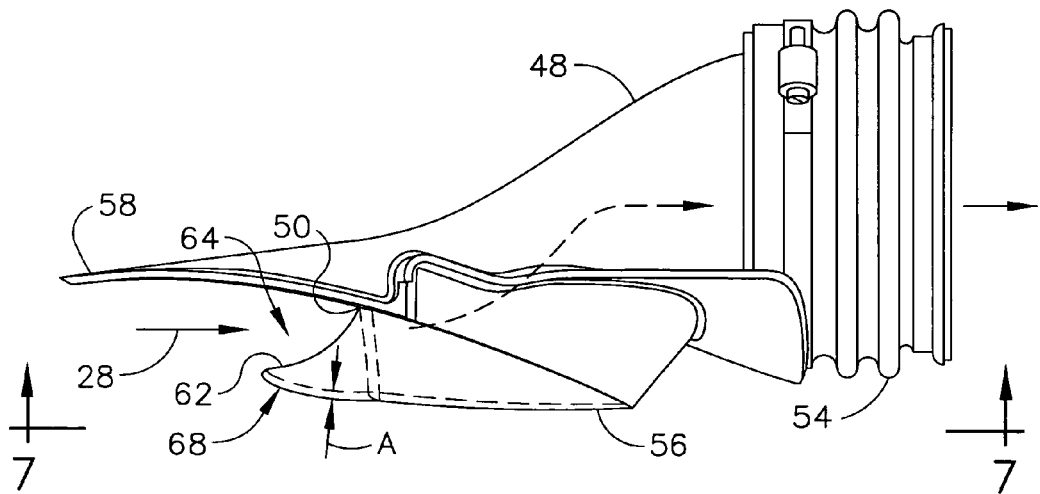
FIG. 6 is a side view of the isolated bleed duct in accordance with another embodiment.
Figure 7:
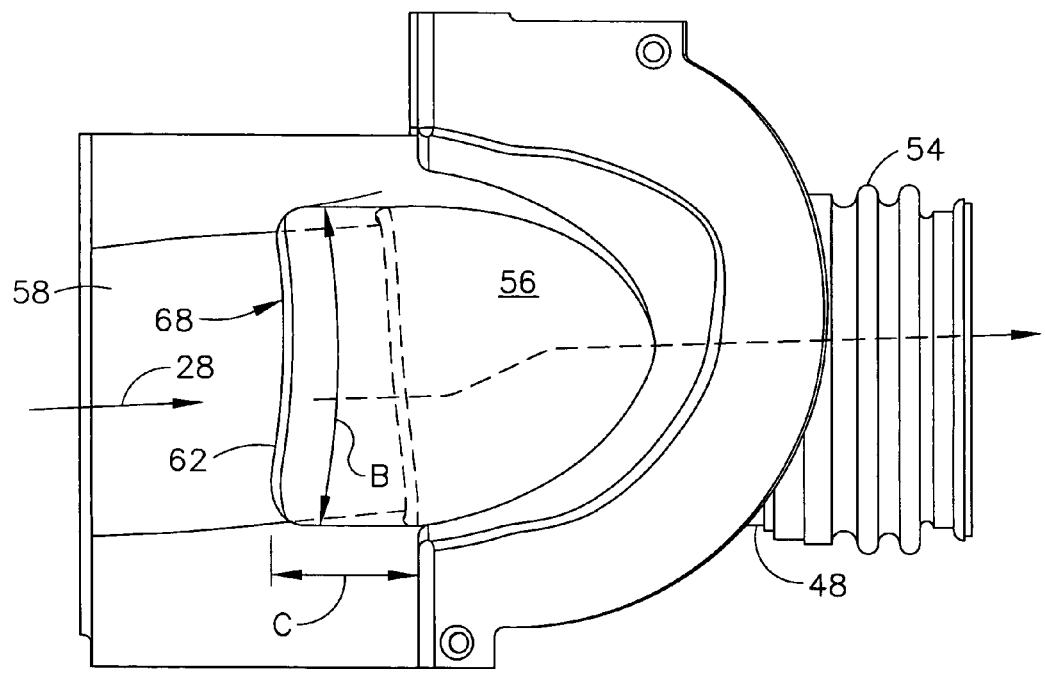
FIG. 7 is a plan view of the bleed duct illustrated in FIG. 6 and taken along line 7-7.

FIGS. 6 and 7 illustrate another embodiment of the acoustic shroud, designated 68. Like the previous shroud 60, the shroud 68 may be integrally formed with the leading edge of the original scoop 56 and extends forwardly in length C from the scoop inlet 50. However, in this embodiment the shroud 60 may be shorter and sufficiently rigid in configuration due to the nominal thickness A thereof and its laterally arcuate configuration for simply being cantilevered from the leading edge of the scoop 56 without additional support, such as the two support legs 66 illustrated in the previous embodiment.

As shown in FIG. 7, the shroud 68 has a maximum length C at the lateral middle thereof, and decreases in length along the opposite side edges thereof back toward the scoop 56. The opposite sides of the shroud 68 are scalloped or curved back to the scoop inlet 50 as shown in FIG. 6 to provide corresponding forms of the side openings 64 found in the previous embodiment.

In the FIG. 7 projection of the shroud 68, the shroud is rectangular in profile and conforms or matches in general the width B corresponding with the scoop 56. The opposite sides of the rectangular shroud 68 curve back to meet the inlet ramp 58 of the bleed duct.

Like the previous embodiment disclosed above, the cantilevered shroud 68 provides an upstream overhang extension of the scoop 56 suspended above the underlying inlet ramp 58 to provide unobstructed inlet flow into the original design tube conduit 48 for maintaining the aerodynamic performance thereof, including the requisite pressure recovery thereof. And also like the previous design, the suppression shroud 68 constrains the outward expansion of any pressure oscillations born in the closed bleed duct for interrupting energy coupling between the incident speeding fan air and the trapped air within the closed duct to suppress the unstable pressure oscillations attributed to the Hartmann Generator performance thereof.

Figure 8:
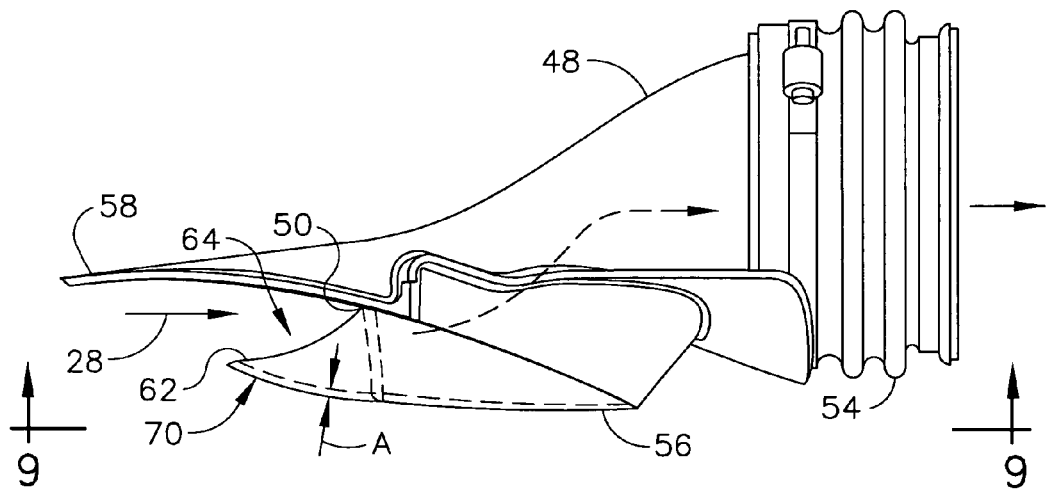
FIG. 8 is a side view of the isolated bleed duct in accordance with another embodiment.
Figure 9:
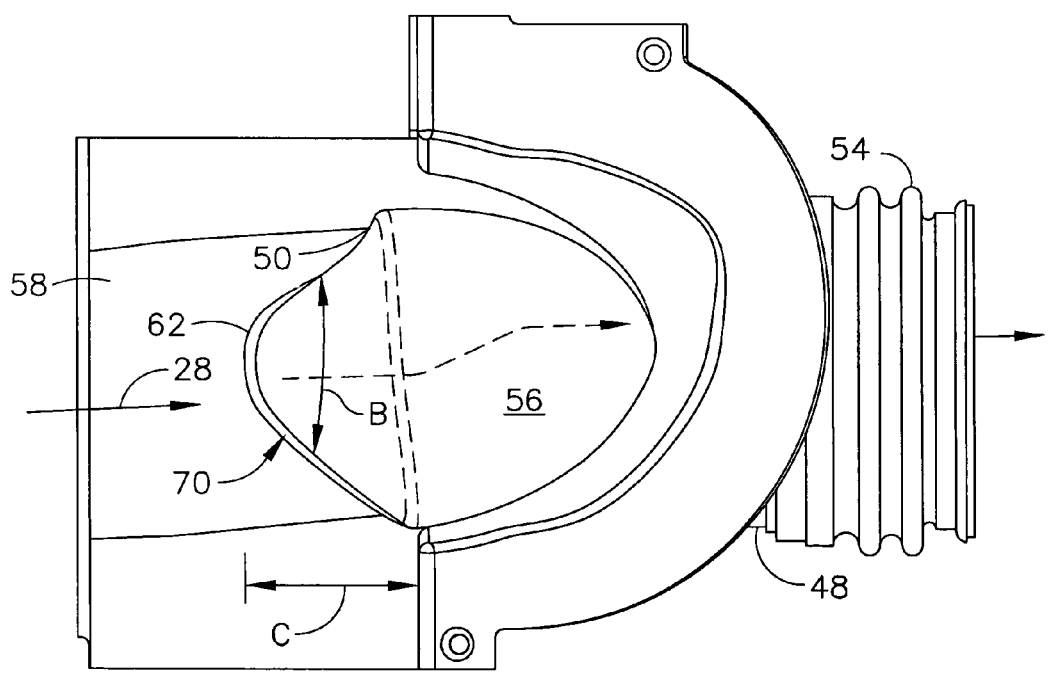
FIG. 9 is a plan view of the bleed duct illustrated in FIG. 8 and taken along line 9-9.

FIGS. 8 and 9 illustrate yet another embodiment of the acoustic suppression shroud, designated 70 which is similar to the previous shroud 68. Whereas the previous shroud 68 has a rectangular profile, the shroud 70 illustrated in FIG. 9 has a triangular profile that conforms in circumferential width B at the base thereof with the scoop 56 at its inlet 50.

The apex of the triangular shroud 70 is arcuate and defines the maximum length C of the shroud measured from the inlet plane of the scoop 56, shown in dashed line. In this triangular configuration, the width B of the shroud decreases both over the width of the underlying inlet ramp 58 as shown in FIG. 9, and over the height of the shroud as it curves back to the junction of the scoop 56 and inlet ramp 58 at the inlet plane of the scoop. The opposite side openings 64 between the shroud 70 and the underlying inlet ramp are larger than the corresponding side openings in the previous embodiment.

And in both embodiments illustrated in FIGS. 6 and 8, the shrouds 68,70 are additionally axially arcuate along the longitudinal axes thereof in the axial upstream direction for additional streamlining and structural rigidity.

Both embodiments illustrated in FIGS. 6-9 are simply cantilevered from the leading edge of the scoop 56 itself, either integrally cast therewith or joined thereto by welding, for example. The two shrouds 68,70 like the previous shroud 60 minimize degradation in aerodynamic performance of the original bleed duct 42 while projecting inside the fan bypass duct 32, while also providing acoustic shrouds overhanging the original scoop inlets 50 for constraining expansion of pressure oscillations when the bleed duct is closed, and thereby suppressing the undesirable acoustic oscillations.

FIGS. 10-13 illustrate two additional configurations of the shrouds, designated 72 and 74. In these embodiments, the shrouds 72,74 are in the form of discrete arches fixedly joined over the inlet ramp 58 and spaced outwardly from the corresponding scoop inlets 50. The shrouds 72,74 may be made of relatively thin sheet metal and either fastened to the underlying inlet ramp 58, or integrally formed or cast therewith if desired.

In both configurations, the shrouds 72,74 have different rectangular profiles or projections both larger in circumferential or lateral width B than that of the scoop 56, and extending in longitudinal length C at least upstream from the corresponding scoops.

In both configurations, the shrouds 72,74 are sheet metal being relatively thin in thickness A to match generally the thickness of the scoop 56 itself and providing a relatively thin, aerodynamically smooth profile when projecting inside the fan bypass duct 32. Both shrouds 72,74 are preferably higher in elevation or height than the scoop 56 to effect corresponding radial gaps D around the perimeter of the scoop inlet 50.

Figure 10:
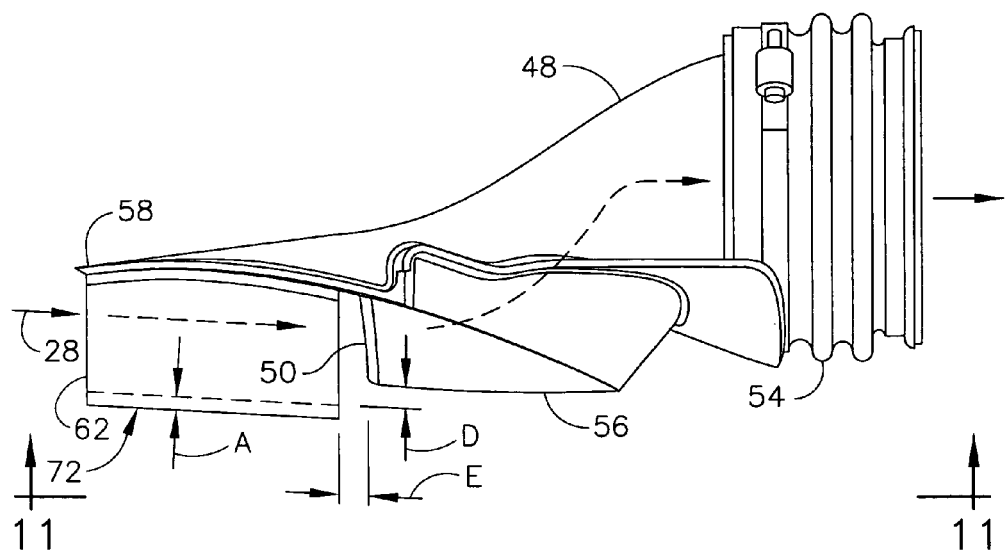
FIG. 10 is a side view of the isolated bleed duct in accordance with another embodiment.
Figure 11:
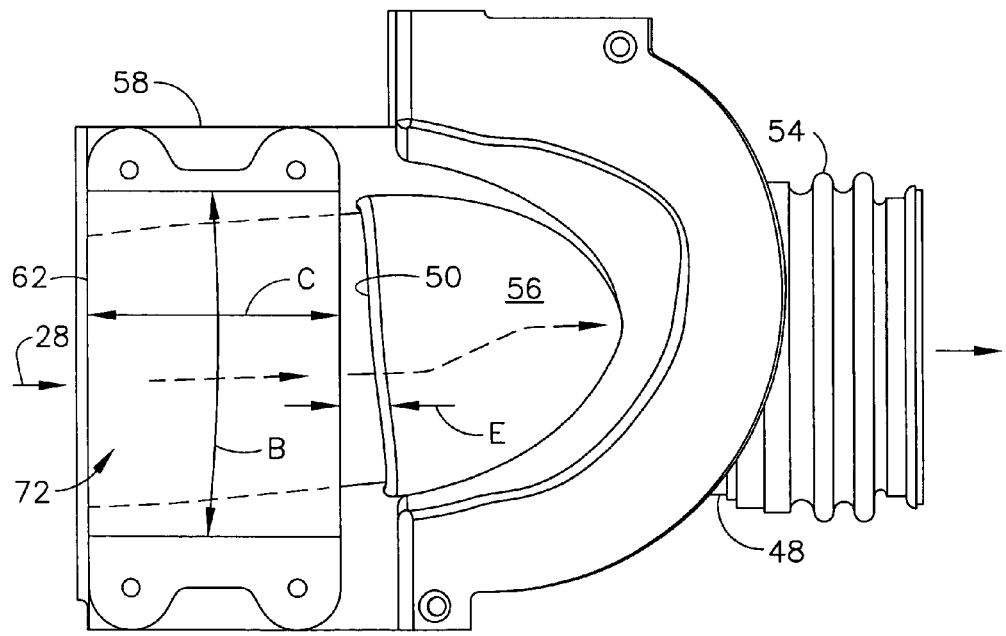
FIG. 11 is a plan view of the bleed duct illustrated in FIG. 10 and taken along line 11-11.

The shroud 72 illustrated in FIGS. 10 and 11 is spaced forwardly between its aft or trailing end and the leading edge of the scoop 56 to effect an axial gap E therebetween. The length C of the shroud 72 corresponds generally with the length of the scoop 56 and covers substantially all of the inlet ramp 58 forward of the scoop 56.

Figure 12:
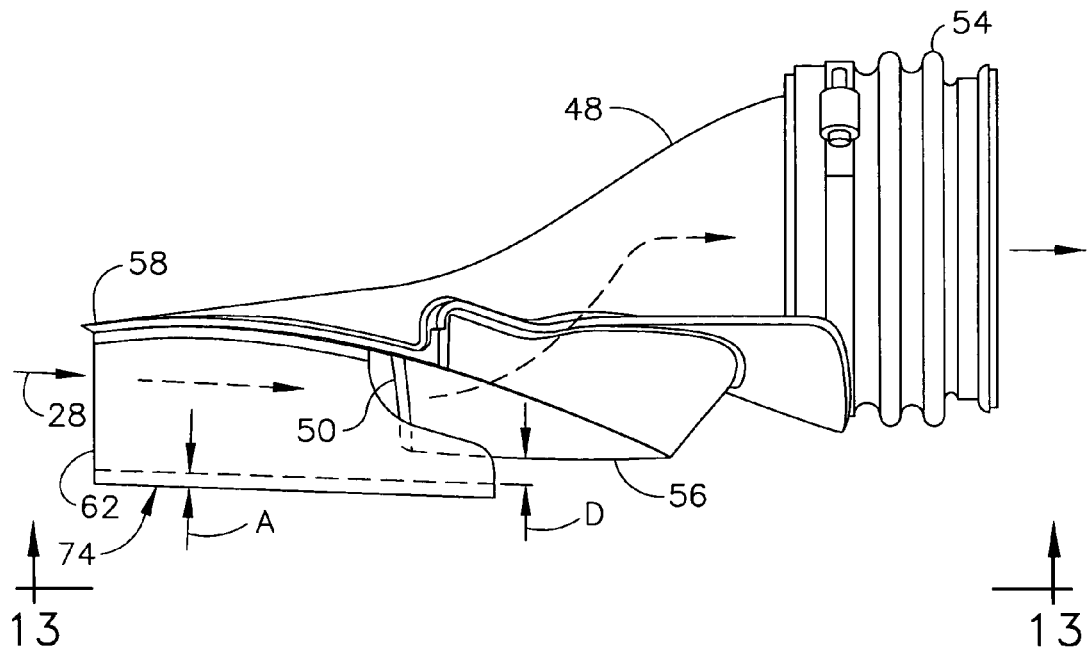
FIG. 12 is a side view of the isolated bleed duct in accordance with another embodiment.
Figure 13:
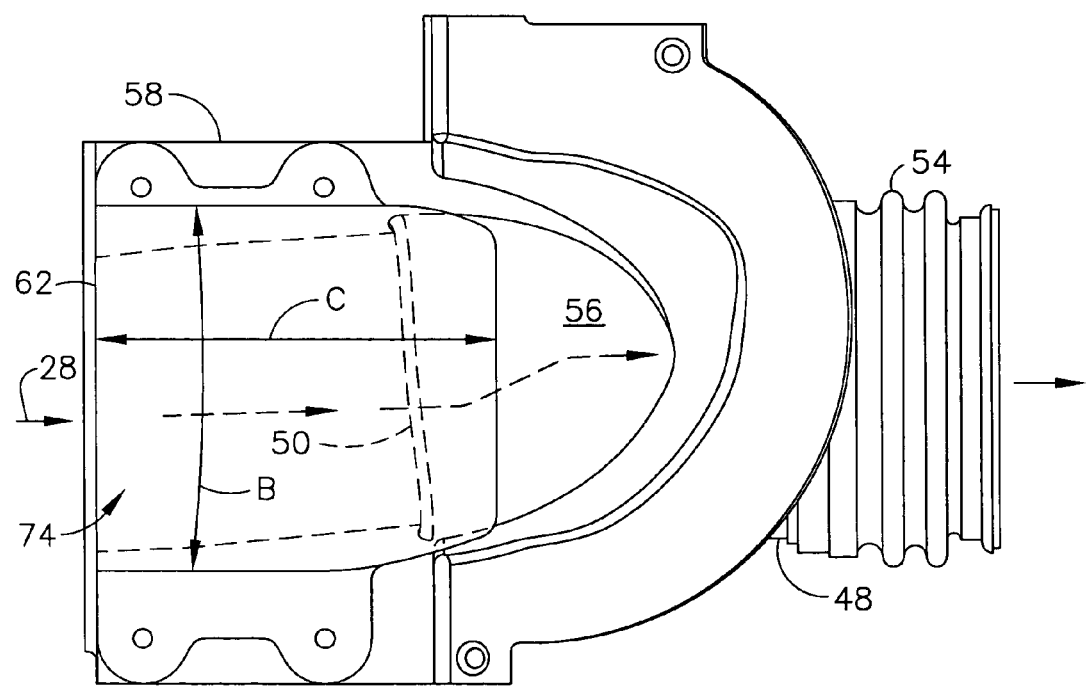
FIG. 13 is a plan view of the bleed duct illustrated in FIG. 12 and taken along line 13-13.

The shroud 74 illustrated in FIGS. 12 and 13 is longer in length C than the shroud 72 described above and has an aft end that overlaps the forward end of the scoop 56 while still providing the radial or transverse gap D therebetween.

In both embodiments illustrated in FIGS. 10-13, the shrouds 72,74 include the corresponding shroud inlets 62 at the forward ends thereof which provide unobstructed access to the corresponding scoop inlets 50 spaced downstream therefrom. In this way, the original aerodynamic performance of the fan bleed duct 42 may be maintained, including the pressure recovery thereof, without obstruction or degradation by the introduction of the added shrouds 72,74 at the entrance thereof.

Correspondingly, the shrouds 72,74, like the previous embodiments, provide overhangs over the inlet ramp 58 to the bleed conduit which extend in most part forwardly from the scoop 56 to constrain expansion of the pressure oscillations that radiate outwardly from the bleed conduit when the exit valve thereof is closed.

The shroud 72 illustrated in FIGS. 10 and 11 is spaced in its entirety from the leading edge of the scoop 56 to provide the axial gap E therebetween in which pressure fluctuations may be attenuated. The cooperating radial gap D ensures unobstructed access of the incident fan air through the shroud 72 to the original scoop inlet 50.

The shroud 74 illustrated in FIGS. 12 and 13 is a modification of the shroud 72 for overlapping in axial projection the underlying scoop 56. However, the sides of the shroud 74 as illustrated in FIG. 12 are scalloped or curved back at the aft ends thereof and bridge the scoop inlet 50 both forward and aft therefrom.

In this way, the radial gap D between the shroud 74 and the scoop 56 ensures unobstructed inlet flow into the original scoop inlet 50. And the radial gap D cooperates with the scalloped sides of the shroud 74 to constrain expansion of pressure fluctuations radiating out from the scoop inlet 50 when the valve 44 is closed.

Laboratory testing of various designs of the acoustic shroud, including those disclosed above, confirm the ability to suppress the dynamic pressure oscillations otherwise experienced with the valve 44 being fully closed. It would appear that the various forms of shrouds disclosed above constrain energy coupling in the otherwise open area around the entrance to the bleed duct and substantially reduce the magnitude of dynamic pressure oscillations to avoid undesirable acoustic or sonic fatigue of the bleed duct components. The volume constraint provided by the acoustic shrouds disclosed above appears to restrict the ability of the high pressure fluctuations or waves to freely expand and otherwise achieve their maximum magnitudes without constraint by the shroud.

The specific configurations of the acoustic shroud may be suitably varied as required by the specific configurations of the fan bleed duct 42 inside the fan bypass duct 32.

The acoustic shroud should have a minimum aerodynamic profile to minimize degradation of aerodynamic performance throughout the operation of the engine, including both operation of the bleed system with the valve 44 open, and cessation of the bleed system when the valve 44 is fully closed.

The shroud should be sufficiently strong and rigid for withstanding the substantial aerodynamic loads exerted thereon by the fast moving fan discharge air.

A fundamental requirement of the shroud in its various configurations is its axial overhang upstream from the leading edge of the scoop 56 to provide effective acoustic suppression of the dynamic pressure oscillations.

The lateral dimensions of the shroud may be selected to provide a relatively open shroud inlet 62 aligned in the downstream direction with the original scoop inlet 50 to pass without obstruction the fan bypass air for efficient pressure recovery inside the fan bleed duct 42. The leading edge of the shroud should conform with the leading edge of the downstream scoop and should be suitably aligned therewith for providing unobstructed flow of the streamlines entering the bleed duct.

The overall profile of the shroud may be selected for each design application for ensuring an aerodynamically smooth surface both inside and outside the shroud for minimizing aerodynamic performance losses, while also maximizing the acoustic suppression capability of the shroud when covering the entrance to the fan bleed duct 42.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbofan engine comprising:
a fan powered by a core engine including a multistage compressor therein, and a fan bypass duct surrounding said core engine;
a bleed system including a primary bleed circuit for bleeding pressurized air from said compressor joined in flow communication with a heat exchanger, and a secondary bleed circuit for bleeding fan air from said fan bypass duct joined in flow communication with said heat exchanger; and
said secondary bleed circuit includes a bleed conduit having a duct inlet facing forwardly inside said bypass duct, and duct outlet joined by a valve to said heat exchanger, and an acoustic suppression shroud extending forwardly from said duct inlet inside said bypass duct with a side opening at said duct inlet for suppressing pressure oscillations inside said bleed conduit when said valve is closed.

2. An engine according to claim 1 wherein said shroud projects inside said bypass duct and is coextensive with said duct inlet, and includes a shroud inlet at a forward end thereof spaced forwardly from said duct inlet.

3. An engine according to claim 2 wherein:
said duct inlet and outlet are laterally offset along the longitudinal axis of said conduit to effect a laterally offset scoop containing said duct inlet and projecting inside said bypass duct; and
said shroud is coextensive with said scoop at said duct inlet therein.

4. An engine according to claim 3 wherein:
said bleed conduit further includes an inlet ramp extending forward from said scoop inlet inside said bypass duct;
said scoop is laterally arcuate and imperforate; and
said shroud is laterally arcuate and imperforate, and disposed over said inlet ramp.

5. An engine according to claim 4 wherein said shroud is integrally joined to said forward end of said scoop.

6. An engine according to claim 5 wherein said shroud is narrower in circumference than said scoop, and is laterally open forward of said scoop inlet.

7. An engine according to claim 6 wherein said shroud includes a pair of support legs at said forward end thereof fixedly joined to said conduit to support said shroud thereabove.

8. An engine according to claim 6 wherein said shroud is cantilevered from said scoop.

9. An engine according to claim 8 wherein said shroud has a maximum length at the middle thereof, and decreases in length along opposite sides thereof.

10. An engine according to claim 4 wherein said shroud is spaced from said scoop.

11. A turbofan bleed duct for a turbofan engine having a fan bypass duct surrounding a core engine, said bleed duct comprising:
a tubular conduit having an annular duct inlet at a forward end configured to face forwardly inside said bypass duct and an annular duct outlet at an opposite aft end, and configured in flow area therebetween for recovering pressure from speeding fan air bled therethrough; and
an acoustic suppression shroud extending forwardly from said duct inlet with a side opening thereto to suppress dynamic pressure oscillations inside said conduit.

12. A duct according to claim 11 wherein said shroud is coextensive with said duct inlet and includes a shroud inlet at a forward end thereof spaced forwardly from said duct inlet.

13. A duct according to claim 12 wherein:
said duct inlet and outlet are laterally offset along the longitudinal axis of said conduit to effect a laterally offset scoop containing said duct inlet; and
said shroud is coextensive with said scoop at said duct inlet therein.

14. A duct according to claim 13 wherein said shroud inlet is axially aligned with said scoop inlet to minimize disturbance of streamline flow of said fan air into said scoop inlet.

15. A duct according to claim 14 wherein said shroud is generally parallel with said scoop to minimize said streamline flow disturbance.

16. A duct according to claim 14 wherein:
said scoop is laterally arcuate and imperforate; and
said shroud is laterally arcuate and imperforate.

17. A duct according to claim 14 wherein said shroud is integrally joined to said forward end of said scoop.

18. A duct according to claim 17 wherein said shroud conforms in thickness with said scoop.

19. A duct according to claim 18 wherein said shroud is narrower in circumference than said scoop, and is laterally open forward of said scoop inlet.

20. A duct according to claim 18 wherein said shroud includes a pair of support legs at said forward end thereof fixedly joined to said conduit to support said shroud thereabove.

21. A duct according to claim 20 wherein said conduit further includes an inlet ramp extending forward from said scoop inlet, and said shroud support legs are fixedly joined thereto.

22. A duct according to claim 20 wherein said shroud has a rectangular profile.

23. A duct according to claim 18 wherein said shroud is cantilevered from said scoop.

24. A duct according to claim 23 wherein said shroud has a maximum length at the middle thereof, and decreases in length along opposite sides thereof.

25. A duct according to claim 24 wherein said shroud sides curve back to said scoop inlet.

26. A duct according to claim 25 wherein said shroud is rectangular in profile, and conforms in width with said scoop.

27. A duct according to claim 25 wherein said shroud is triangular in profile, and conforms in width at the base thereof with said scoop.

28. A duct according to claim 14 wherein said shroud is spaced from said scoop.

29. A duct according to claim 28 wherein said conduit further includes an inlet ramp extending forward from said scoop inlet, and said shroud comprises an arch fixedly joined to said ramp and spaced outwardly from said scoop inlet.

30. A duct according to claim 29 wherein said shroud has a rectangular profile, larger in width than said scoop, and extending in length forward therefrom.

31. A duct according to claim 30 wherein said shroud is higher than said scoop to effect a radial gap thereabove.

32. A duct according to claim 31 wherein said shroud is spaced forwardly from said scoop to effect an axial gap therebetween.

33. A duct according to claim 31 wherein said shroud overlaps said forward end of said scoop.

34. A duct according to claim 33 wherein said shroud includes scalloped sides at the aft ends thereof bridging said scoop inlet both forward and aft therefrom.

35. A turbofan bleed duct for a turbofan engine having a fan bypass duct surrounding a core engine, said bleed duct comprising:

a tubular conduit having an annular duct inlet at a forward end configured to face forwardly inside said bypass duct and an annular duct outlet at an opposite aft end, and configured in flow area therebetween for recovering pressure from speeding fan air bled therethrough; and an acoustic suppression shroud extending forwardly from said duct inlet coaxially in line-of-sight alignment therewith to provide both a shroud inlet at the forward end of said shroud and a side opening at said duct inlet.

* * * * *

UNITED STATES PATENT AND TRADEMARK OFFICE
CERTIFICATE OF CORRECTION

PATENT NO.       : 7,607,308 B2                                          Page 1 of 1
APPLICATION NO.  : 11/297698
DATED            : October 27, 2009
INVENTOR(S)      : Kraft et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 992 days.

Signed and Sealed this

Twelfth Day of October, 2010

David J. Kappos
*Director of the United States Patent and Trademark Office*